United States Patent [19]

Fowler et al.

[11] 3,748,976

[45] July 31, 1973

[54] SELECTION SYSTEM

[75] Inventors: Raymond L. Fowler; Roderick S. Heard, both of Lexington, Ky.

[73] Assignee: International Business Machines Corporation, Armonk, N.Y.

[22] Filed: June 30, 1971

[21] Appl. No.: 158,307

[52] U.S. Cl. .......... 95/4.5

[51] Int. Cl. .......... B41b 21/26

[58] Field of Search .......... 353/25, 26, 27, 82, 353/89, 94, 121, 122; 95/4.5

[56] References Cited

UNITED STATES PATENTS

| | | | |
|---|---|---|---|
| 2,392,224 | 1/1946 | Bryce | 95/4.5 |
| 2,663,232 | 12/1953 | Drillick | 95/4.5 |
| 2,744,457 | 5/1956 | Higonnet | 95/4.5 |
| 2,781,706 | 2/1957 | Higonnet | 95/4.5 |
| 2,803,178 | 8/1957 | Lotz | 95/4.5 |

*Primary Examiner*—John M. Horan
*Attorney*—E. Ronald Coffman et al.

[57] ABSTRACT

Information items are selected by permutative positioning of a group of adjacent two-position slide members. The slide members are characterized by their compact arrangement of blocking and passing code portions which cooperate with both of two adjacent information transmission channels. The compactness of the system, achieved by the code portion arrangement, is accompanied by some loss in code set efficiency as to the number of outputs selectable from a permutation of a given order; however, certain unique and repetitive patterns exist by which reasonable efficiency can be achieved.

9 Claims, 14 Drawing Figures

INVENTORS
RAYMOND L. FOWLER
RODERICK S. HEARD

BY E. Ronald Coffman
ATTORNEY

SELECTION SYSTEM

DISCLOSURE OF THE INVENTION

Selection of one or more data items from a group through use of a permutated binary input is employed in many arts. For example, a group of binarily positionable slides may mechanically select an individual character for printing in a teletypewriter system or may select an individual light path for projecting a character for printing in a photocomposer system. Typical of prior selection systems is a coding arrangement by which a plurality of data channels are intercepted by a stack of slides which structurally are coded to either block or pass information through the data channels. Positioning of the individual slides to present an unblocked data channel provides for selection of the data represented by that channel to the exclusion of data represented by channels which are blocked. This technique has been applied to selection systems employing pneumatic data channels, mechanical data channels, optical data channels, and electrical data channels. It has been usual to construct the slide code portions to be substantially independent for each data channel. In other words, the coding structure for controlling one data channel is physically separate from that for controlling the adjacent data channels. This arrangement, while efficient in enabling full use of all permutations available in a predetermined number of slides, requires the dedication of a significant amount of space between data channels to provide for the independent coding. Where compactness and light weight are sought, it is desirable to minimize wasted space and the material associated with it.

Accordingly, an object of our invention has been to provide a selection system having a plurality of binary selector slides having blocking or passing code portions arranged to cooperate with at least two adjacent data channels representing items of information to thereby achieve a more compact selection system.

Another object of our invention has been to devise an arrangement of slide coding to minimize the number of slides necessary to uniquely select one of a relatively large plurality of data items while maintaining the compactness of a system having interdependent slide coding.

A further object of our invention has been to provide a selection system for combining data bits generally from permutated ordered arrays of data bits to minimize the number of stored data bits required to select from a given number of items.

A still further object of our invention has been to devise a system for arranging the coding of selection systems having interdependent coding to enable the construction of selection systems for various numbers of information items.

Our invention is accomplished through the coding of an ordered array of data bearing means, such as slides, judiciously so as to enable stored data bits, such as blocking and passing code portions of the slides to cooperate with both of a pair of adjacent data channels in such a way as to select unique ones of the data channels by permutative combinations of binary positions of the coded slides. We have found that some arrangements of blocking and passing portions are more efficient than others in minimizing the number of slides necessary to uniquely select from among a given number of data channels, To some extent, these more efficient arrangements are unpredictable and must be arrived at by a process of empirical design. We have discovered, however, certain building block patterns that can be combined and repeated as required to build up elaborate coding systems as required to efficiently select from among a fairly large number of data channels.

These and other objects, features and advantages of our invention will be understood by those skilled in the art from the following description of some specific illustrative embodiments thereof, wherein reference is made to the accompanying drawings, of which:

Figure 1:
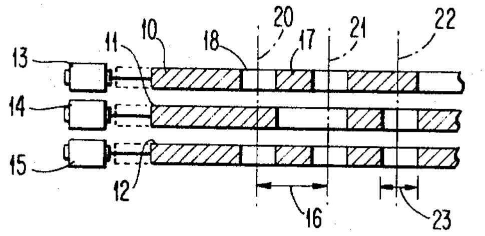
FIG. 1 illustrates a cross-sectional fragment of a prior art selection system.

In FIG. 1 there is shown a small portion of a typical selector system like that known in the prior art and comprising a plurality of independently movably mounted binary data bearing slide members 10, 11, and 12 which are assembled in a stack to serially intercept each of a plurality of discret data channels or information output paths 20, 21, and 22. The slide members 10, 11, and 12 are selectively and individually positioned or shifted by respective actuators 13, 14, and 15 to one of two positions or states as shown in full and broken lines, respectively. The centers of adjacent channels of slides 20 and 21 are spaced by a distance 16 that is at least two times the width 23 of the channels so that the channels can be independently coded.

Each of the slide members 10, 11, and 12 is provided with an ordered array of code portions or data bits of either a blocking nature such as code portion 17 in slide 10 or is of a passing or nonblocking nature such as code portion 18 of slide 10. The blocking and passing code portions 17 and 18 are arranged adjacent each of the data channels 20, 21 and 22 to control selective opening and closing of those channels upon selective permutative positioning of the slides 10, 11 and 12. For example, data channel 21 is selected with the slides 10, 11 and 12 in their full line positions. If slide 11 is displaced to its broken line position, data channel 20 will become unblocked and data channel 21 will be blocked, thereby selecting data channel 20. If slide 10 is displaced to its broken line position, data channel 22 will become unblocked. It can thus be seen that data channels 20, 21 and 22, and the blocking and unblocking code portions 17 and 18, adjacent thereto, are relatively independent, and could be interchanged as to their locations along the slides.

With this type of selection system, it is possible to achieve full use of the permutations available with any given number of variables. Three slides, each having two operative positions, will yield $2^3$ or eight variables thus allowing the control of eight different channels. The independence of the coding for each data channel, however, requires dedication of space between adjacent data channels equal in size at least to the space required for the data channel itself.

Figure 2:
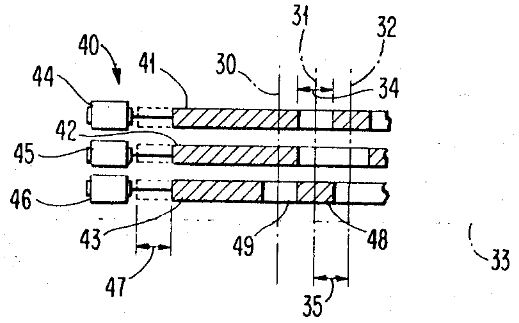
FIG. 2 illustrates a similar fragment of a selection system constructed in accordance with our invention.

FIG. 2 shows a similar fragmentary portion of a selector system constructed in accordance with our invention. At the outset, it is to be noted that data channels or information output paths 30, 31 and 32 for carrying predetermined items of information are immediately adjacent one another and lie at substantially equally spaced locations along the axis 33. The wasted space occuring between data channels in the prior art arrangement shown in FIG. 1 has been virtually eliminated, since the paths 30, 31 and 32 have a width 34 in the direction of axis 33 that equals or is only slightly less than their center spacing distance 35.

The selector system shown in FIG. 2 comprises a permutation device 40 having a plurality of independently movably mounted two-position binary data bearing slides or shutter members 41, 42 and 43 that are stacked to serially intercept each of the data channels 30, 31 and 32. Actuators 44, 45 and 46 are operated selectively and independently to shift their respective slide members 41, 42 and 43 in either the full or broken line positions or states shown. Note that the displacement 47 between these positions is substantially equal to the spacing 35 between adjacent data channels 30, 31 and 32.

Adjacent each of the data channels 30, 31 and 32 are either blocking code or data bit portions 48 or oppositely natured passing or non-blocking code or data bit portions or apertures 49. Unlike the code portions 17 and 18 of the prior art device shown in FIG. 1, the code portions 48 and 49 of FIG. 2 act upon both of two adjacent data channels such as 30 and 31. Thus, the coding for adjacent data channels 30 and 31 is interdependent, rather than independent as in the prior art device.

With the coding arrangement as shown in FIG. 2, displacement of slide 43 to its broken line position will unblock channel 31. Displacement of slides 41 and 42 to their broken line position will unblock channel 30. Displacement of slide 41 to its broken line position will unblock channel 32. It is possible to continue the coding of slides 41, 42 and 43 so as to enable unique selection from among six data channels. This coding could be either in the form:

1010101
1001001
0100100 wherein 1 represents a blocking portion 48 and 0 represents a passing or non-blocking portion 49. Each horizontal row represents the ordered array of data bits carried by a separate slide, and the data channels are represented by six of the seven vertical columns shown. The extra column at the end does not control a separate data channel but merely provides code portions for its inwardly adjacent channel. Alternatively, the three slides could be encoded in the form:

1010101
1001001
1010010

It will be seen from a comparision of FIGS. 1 and 2 that our system occupies substantially half the space of the prior art system. Thus, the adjacent data channels are more compactly arrayed and the slides are of significantly lower inertia. All of the permutations, however, available with a given number of slides do not produce unique data channel selection, and for this reason, it may be necessary to have a greater number of slides for unique selection from a given number of channels.

Figure 3:
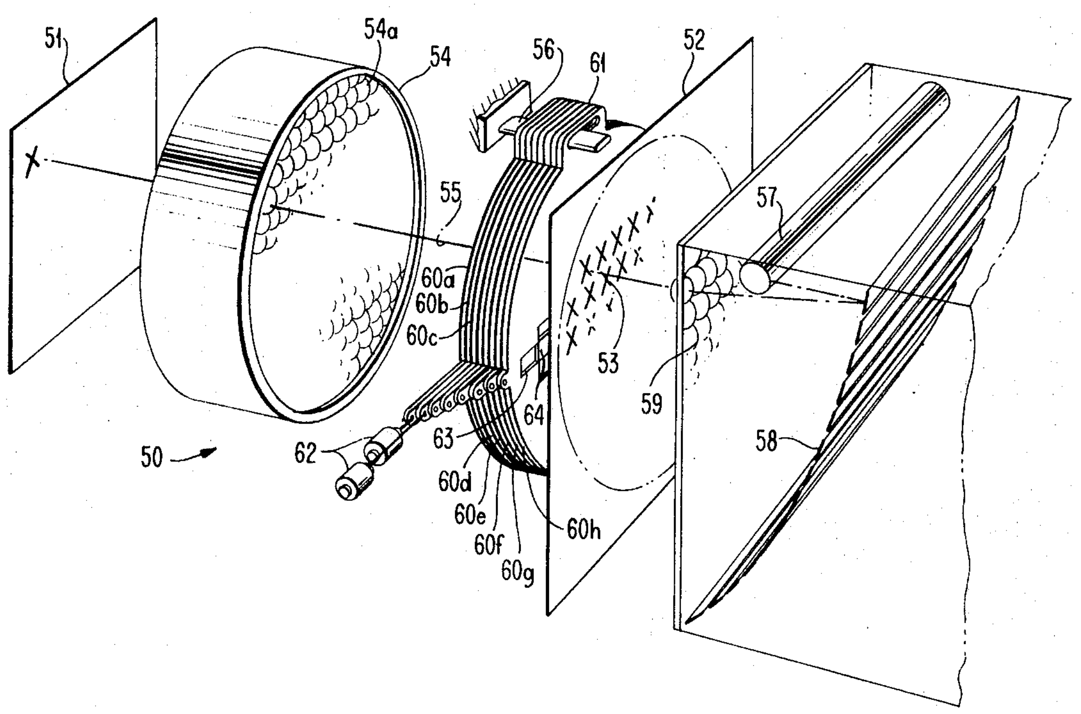
FIG. 3 is a simplified perspective view of a character selection device for a photocomposer having a multiple shutter character selection system constructed in accordance with our invention.
Figures 5A, 5B, 5C, 5D, 5E, 5F, 5G, 5H, 5I, 5J:
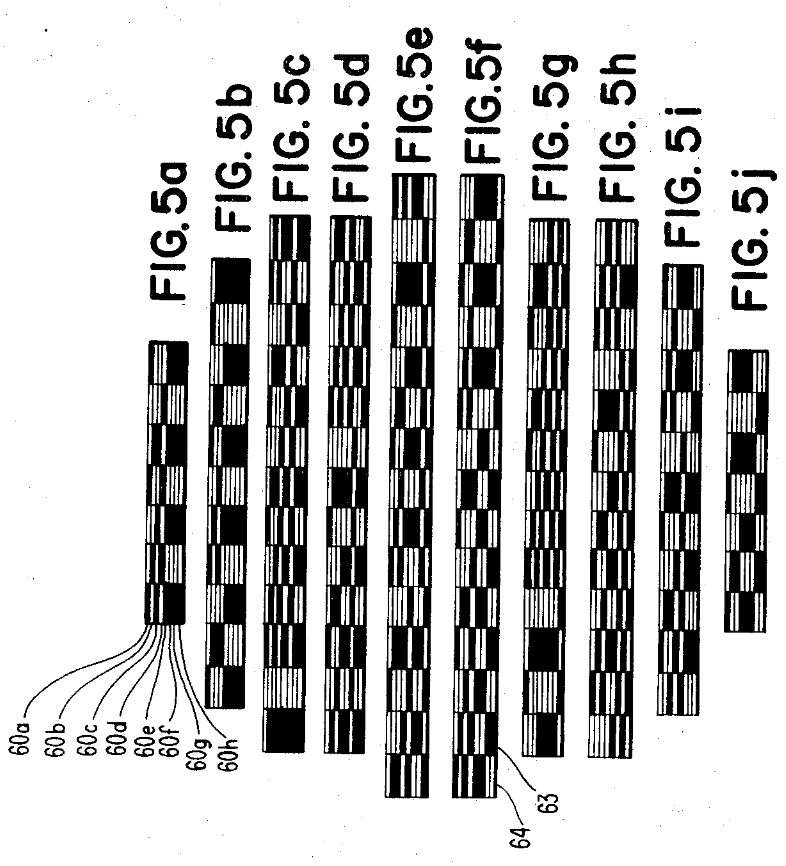
FIGS. 5A through 5J are cross-sectional diagrams having a preferred coding arrangement,for the multiple shutter character selection system shown in FIG. 3.

FIGS. 3, 4, and 5A through 5J show a preferred application of our selection system as part of a photocomposer 50 that prints individual characters, one at a time, on a photosensitive film 51 in a manner well known to those skilled in the art. The photocomposer 50 includes a character matrix or information source 52 having character-shaped transparencies 53 thereon for selective projection onto the film 51 by a fly's eye lens 54. Individual paths 55 are established between the matrix 52 and the individual components 54*a* of the lens 54. Selection of individual characters from the matrix 52 is accomplished by a group of eight slide or shutter members 60 *a–h* configured in accordance with our invention (See also FIGS. 5A–5J). Each slide member 60 a-h is slidably mounted on upper and lower frame mountings 56 (only one of which is shown in FIG. 3) by slotted tabs 61, and are positionable to one of two active positions or slots by associated individual electromagnets 62 to select a unique unblocked data channel or path 55. A flash lamp 57 illuminates the selected character transparency 53 via compensating reflector 58 and collimating lens 59 for projection onto the film 51.

The slides 60 *a–h* each have an appropriate set of blocking code portions 63 and passing or unblocking code portions or apertures 64 as shown particularly in FIGS. 5A–5J. While the coding arrangements discussed in connection with FIG. 2 involved a simple linear array, the paths 55 of FIG. 3 are grouped in a somewhat circular fashion by breaking a large linear coding scheme into smaller segments.

Figure 4:
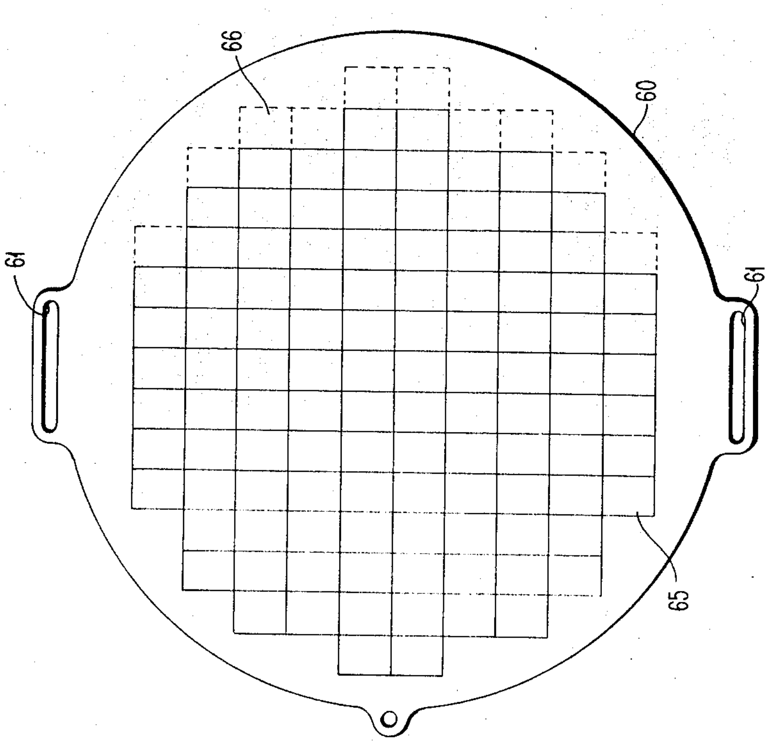
FIG. 4 is a layout drawing of a slide configuration used in conjunction with the photocomposer of FIG. 3.

FIG. 4 is a layout drawing of a slide member 60 showing all possible locations of code portions 63 and 64 suitable for selection from up to 108 characters. The full line locations, such as 65, coincide with individual paths 55 in the rest position of the slide member 60 whereas the broken line locations such as 66 align with a path 55 only when the slide member 60 has been displaced to the left. It can thus be seen that the paths 55 are compactly arranged within a somewhat circular matrix. The particular arrangment of coded portions 63 and 64 would be different for each of the slide members 60 *a–h*. One suitable arrangement is shown by the cross-section views of FIG. 5A–5J which is taken respectively through each of the horizontal rows of code portion locations 65 and 66 of the stack of slides 60 *a–h*.

By arranging the paths 55 in an approximate circle and employing the coding arrangement of our invention, a character matrix 52 having an active diameter of only 1.85 inch is possible, based on a character transparency 53 having a size no greater than 0.167 inch × 0.125 inch. This compactness minimizes distortion and light loss in the optics system and, in fact, provides twice the light efficiency of a system designed in accordance with the prior art. Also, it will be recognized that the compactness of the slide members 60 *a–h* minimizes their inertia to thereby increase the speed at which they can be reliably displaced.

While a particular preferred embodiment of a selection system capable of selecting a large number of data channels is shown in FIG. 4, we have also devised a system for arranging the coded portions of slides to produce any number of outputs without requiring a complete empirical design effort. Our system of coding involves the use of certain building block subsets or code arrangements that can be progressively chained together, doubled, tripled and multiplied together, so far as necessary to produce any desired number of output selections. While this design system is particularly convenient, the results may not be optimum insofar as the total number of output selections is concerned. However, use of the building blocks discovered by us will enable a more rapid approach to an optimum design by providing the basis of a coding arrangement which, through empirical manipulation may be somewhat improved in its permutative efficiency.

Certain coding patterns duplicate columns periodically and can be repeated. Thus, for the ultra-simple system having two slides, the pattern

```
1001
0100
```

is repeatable as indicated by its identical end columns and is capable of selecting from among three data channels. The two slide pattern above can be doubled by repetition and the addition of one slide having alternating blocking and passing portions yield

```
1001001
0100100
1010101
```

This pattern itself is repeatable and is capable of selecting from among six data channels. For four slides, the repeatable pattern

```
001001001010
010010010010
010100101010
010101010100
```

exists and which is capable from selecting among 11 data channels. An alternate non-repeatable pattern also exists; namely,

```
101010101010
100100100100
101001001001
101010010101
```

While these special code patterns are useful in and of themselves, it is often desirable to select from among a much larger number of data channels. This can be accomplished empirically as by trial and error or systematically through the use of the foregoing repeatable patterns as building blocks. Actually, both empirical and systematic techniques can be combined, if desired. One rule to be followed in an empirical determination is that within a given horizontal row there may not appear any adjacent ones, or else it will be impossible to place a passing code portion in one of the two adjacent columns.

In systematically approaching the pattern determination, the basic pattern

```
100
010
```

can be defined as $C_3$, meaning that 3 channels can be selected from. This pattern can be tripled by the addition of two slides as follows:

$$\begin{matrix} C_3 & C_3 & C_3 \\ I_3 & O_3 & O_3 \\ O_3 & I_3 & O_3 \end{matrix} \qquad \text{where } I_3 = 101, \quad O_3 = 010$$

to select from among 9 data channels. Note that this pattern is less efficient than the four slide coding patterns set forth above which could control 11 data channels.

If the nine channel pattern is defined as $C_9$ the pattern can be further tripled by the addition of two more slides to select from among 27 data channels as follows:

$$\begin{matrix} C_9 & C_9 & \\ I_9 & O_9 & O_9 \\ O_9 & I_9 & O_9 \end{matrix} \qquad \text{where } I_9 = 101010101, \quad O_9 = 010101010$$

Obviously, this progression can be carried out indefinitely to accomodate any number of data channels.

The building block patterns can be combined in other ways. For example, the code pattern for the photocomposer 50 shown in FIGS. 3, 4, and 5A – 5J enables selection from a character set of up to 108 characters using 8 slides. This code pattern was achieved by multiplication of the repetitive pattern $C_9$ and the non repetitive 11 channel code pattern set forth above, i.e., the pattern $C_9$ was repeated or chained 12 times to provide coding for four of the 8 slides. Then the above described non repetitive pattern for 11 channels

```
101010101010
100100100100
101001001001
101010010101
```

was expanded to provide the coding for the remaining 4 of the 8 slides by substitution of $I_9$ and $O_9$ as defined above for each of the 1's and 0's respectively.

As explained above, the linear array thus produced was broken into smaller segments to produce the compact circular configuration shown in FIGS. 4 and 5A – 5J.

Although a specific preferred embodiment of our invention has been shown and described herein for purposes of illustration, those skilled in the art will recognize that the concepts of our selection system are applicable to a wide variety of configurations and applications. Thus our selection concept can be implemented mechanically, pneumatically or electrically as well as optically. Also, selection of unique outputs may not always be desired and our concept can be applied to select plural data channels in response to certain input permutations. Further, our concepts can be usefully combined with a prior art selection systems as shown in FIG. 1 herein where, for example, it may be desired to add a limited number of data channels to existing prior art selection system without increasing its size.

It will also be recognized that our system can be implemented electronically for selection of data by the coincidence of selected data bits permutatively presented by a group of ordered arrays of data bits stored for example in shift registers. Depending upon the particular design, it is possible to achieve a substantial saving of storage locations by interdependent coding in accordance with our invention. In light of these many varied applications of our concepts, we intend the subject matter sought to be patented to be limited only by the appended claims.

I claim:

1. Apparatus for selecting one of *n* predetermined items of information comprising:

means establishing *n* discrete information paths which are each individually associated with one of said items of information, permutation means comprising at least three independently moveably mounted slide members assembled to serially intercept each of said discrete information paths at separate locations, the centers of at least some of said locations being equally spaced along a first axis, means for selectively positioning each of said slide members in one of two operative positions along said first axis, said operative positions being spaced apart equally for each of said slide members and by an amount substantially equal to the spacing between the centers of adjacent ones of said some information path locations, each of said slide members having a plurality of information passing and blocking code portions that are selectively positionable by movement of said slide members, into and out of alignment with said information paths, said code portions being arranged in the pattern:

| | |
|---|---|
| 1010101 | for a first one of said slide members |
| 1001001 | for a second one of said slide members |
| 1010010 | for a third one of said slide members |

wherein 0 represents the presence of an information passing code portion and 1 represents the presence of an information blocking code portion, whereby said slide members are positionable in combination to align different ones of said information passing portions with different ones of said information paths to select one of said items of information by unblocking the information path associated therewith.

2. Apparatus for selecting one of *n* predetermined items of information comprising:

means establishing n discrete information paths which are individually associated with one of said items of information, permutation means comprising at least three independently moveably mounted slide members assembled to serially intercept each of said discrete information paths at separate locations, the centers of at least some of said locations being equally spaced along a first axis, means for selectively positioning each of said slide members in one of two operative positions along said first axis, said operative positions being spaced apart equally for each of said slide members and by an amount substantially equal to the spacing between the centers of adjacent ones of said some information path locations, each of said slide members having a plurality of information passing and blocking code portions that are selectively positionable by movement of said slide members, into and out of alignment with said information paths, said code portions being arranged in the pattern:

| | |
|---|---|
| 1010101 | for a first one of said slide members |
| 1001001 | for a second one of said slide members |
| 0100100 | for a third one of said slide members |

wherein 0 represents the presence of an information passing code portion and 1 represents the presence of an information blocking code portion, whereby said slide members are positionable in combination to align different ones of said information passing portions with different ones of said information paths to select one of said items of information by unblocking the information path associated therewith.

3. Apparatus for selecting one of *n* predetermined items of information comprising:

means establishing n discrete information paths which are individually associated with one Of said items of information, permutation means comprising at least four independently moveably mounted slide members assembled to serially intercept each of said discrete information paths at separate locations, the centers of at least some of said locations being equally spaced along a first axis, means for selectively positioning each of said slide members in one of two operative positions along said first axis, said operative positions being spaced apart equally for each of said slide members and by an amount substantially equal to the spacing between the centers of adjacent ones of said same information path locations, each of said slide members having a plurality of information passing and blocking code portions that are selectively positionable by movement of said slide members, into and out of alignment with said information paths, said code portions being arranged in the pattern:

| | |
|---|---|
| 001001001010 | for a first one of said slide members |
| 010010010010 | for a second one of said slide members |
| 010100101010 | for a third one of said slide members |
| 010101010100 | for a fourth one of said slide members |

wherein 0 represents the presence of an information passing code portion and 1 represents the presence of an information blocking code portion, whereby said slide members are positionable in combination to align different ones of said information passing portions with different ones of said information paths to selzct one of said items of information by unbocking the information path associated therewith.

4. Apparatus for selecting one of *n* predetermined items of information comprising:

means establishing n discrete information paths which are individually associated with one of said items of information, permutation means comprising at least four independently moveably mounted slide members assembled to serially intercept each of said discrete information paths at separate locations, the centers of at least some of said locations being equally spaced along a first axis, means for selectively positioning each of said slide members in one of two operative positions along said first axis, said operative positions being spaced apart equally for each of said slide members and by an amount substantially equal to the spacing between the centers of adjacent ones of said some information path locations, each of said slide members having a plurality of information passing and blocking code portions that are selectively positionable by movement of said slide members, into and out of alignment with said information paths, said code portions being arranged in the pattern:

| | |
|---|---|
| 101010101010 | for a first one of said slide members |
| 100100100100 | for a second one of said slide members |
| 101001001001 | for a third one of said slide members |
| 101010010101 | for a fourth one of said slide members |

wherein 0 represents the presence of an information passing code portion and 1 represents the presence of an information blocking code portion, whereby said slide members are positionable in combination to align different ones of said information passing portions with different ones of said information paths to select one of said items of information by unblocking the information path associated therewith.

5. Apparatus for selecting one of *n* predetermined items of information comprising:

means establishing *n* discrete information paths which are individually associated with one of said items of information, permutation means comprising at least four independently moveable mounted slide members assembled to serially intercept each of said discrete information paths at separate locations, the centers of at least some of said locations being equally spaced along a first axis, means for selectively positioning each of said slide members in one of two operative positions along said first axis, said operative positions being spaced apart equally for each of said slide members and by an amount substantially equal to the spacing between the centers of adjacent ones of said some information path locations, each of said slide members having a plurality of information passing and blocking code portions that are selectively positionable by movement of said slide members, into and out of alignment with said information paths, said code portions being arranged in the pattern:

| | |
|---|---|
| 010010010 | for a first one of said slide memberS |
| 001001001 | for a second one of said slide members |
| 010101001 | for a third one of said slide members |
| 001010101 | for a fourth one of said slide members |

wherein 0 represents the presence of an information passing code portion and 1 represents presence of an information blocking code portion, whereby said slide members are positionable in combination to align different ones of said information passing portions with different ones of said information paths to select one of said items of information by unblocking the information path associated therewith.

6. Apparatus as defined in claim 5, wherein:

said permutation means comprises at least six slide members and said code portions are arranged in the pattern:

| | | |
|---|---|---|
| $C_9$ | $C_9$ | $C_9$ |
| $I_9$ | $O_9$ | $O_9$ |
| $O_9$ | $O_9$ | $I_9$ |

wherein $C_9$ represents the code portions of four of said slide members arranged in the pattern defined in said claim 8 and wherein $I_9$ represents the sub-pattern 101010101 in a fifth one of said slide members and $O_9$ represents the sub-pattern 010101010 in a sixth one of said slide members.

7. Apparatus as defined in claim 5, wherein:

said permutation means comprises eight slide members and said code portions are arranged in the pattern:

$C_9$ $C_9$ $C_9$ $C_9$ $C_9$ $C_9$ $C_9$ $C_9$ $C_9$ $C_9$ $C_9$ $C_9$ in four of said slide members $I_9$ $O_9$ $I_9$ $O_9$ $I_9$ $O_9$ $I_9$ $O_9$ $I_9$ $O_9$ $I_9$ $O_9$ in a fifth one of said slide members $I_9$ $O_9$ $O_9$ $I_9$ $O_9$ $O_9$ $I_9$ $O_9$ $O_9$ $I_9$ $O_9$ $O_9$ in a sixth one of said slide members $I_9$ $O_9$ $I_9$ $O_9$ $O_9$ $I_9$ $O_9$ $O_9$ $I_9$ $O_9$ $O_9$ $I_9$ in a seventh one of said slide members $I_9$ $O_9$ $I_9$ $O_9$ $I_9$ $O_9$ $O_9$ $I_9$ $O_9$ $I_9$ $O_9$ $I_9$ in an eighth one of said slide members wherein $C_9$ represents the pattern defined in said claim 8 and wherein $I_9$ represents the sub-pattern 101010101 and $O_9$ represents the sub-pattern 010101010.

8. Apparatus for selecting one of *n* predetermined items of information comprising:

means establishing *n* discrete information output means which are each individually associated with one of said items of information, permutation means comprising at least three independently shiftable binary data bearing means for interacting in combination with each of said discrete information output means to select information output thereof, each of said data bearing means comprising means establishing an ordered array of binary data bits, said ordered arrays of data bits being arranged in the pattern:

| | |
|---|---|
| 1010101 | for a first one of said data bearing means |
| 1001001 | for a second one of said data bearing means |
| 0100100 | for a third one of said data bearing means |

and means for selectively shifting each of said arrays to one of two operative states with respect to said information output means, said operative states presenting individual data bits from each of said arrays alternatively to either of two of said information output.

9. Apparatus for selecting one of *n* predetermined items of information comprising:

means establishing *n* discrete information output means which are each individually associated with one of said items of information, permutation means comprising at least three independently shiftable binary data bearing means for interacting in combination with each of said discrete information output means to select information output thereof, each of said data bearing means comprising means establishing an ordered array of binary data bits, said ordered arrays of data bits including the cooperative patterns:

| | |
|---|---|
| 1001 | in a first one of said data bearing means and |
| 0100 | in a second one of said data bearing means |

and means for selectively shifting each of said arrays to one of two operative states with respect to said information output means, said operative states presenting individual data bits from each of said arrays alternatively to either of two of said information output.

* * * * *

PO-1050
(5/[illegible])

UNITED STATES PATENT OFFICE
CERTIFICATE OF CORRECTION

Patent No. 3,748,976 Dated October 15, 1973

Inventor(s) Raymond L. Fowler; Roderick S. Heard

It is certified that error appears in the above-identified patent and that said Letters Patent are hereby corrected as shown below:

Column 6, line 6 After $C_9$ $C_9$ insert -- $C_9$ --

Column 8, line 20 the word "same" should read --some--

Column 8, line 41 the word "selzct" should read --select--

Column 9, line 62 through line 64 should read:

| | | |
|---|---|---|
| $C_9$ | $C_9$ | $C_9$ |
| $I_9$ | $0_9$ | $0_9$ |
| $0_9$ | $I_9$ | $0_9$ |

Signed and sealed this 1st day of January 1974.

(SEAL)
Attest:

EDWARD M.FLETCHER,JR.
Attesting Officer

RENE D. TEGTMEYER
Acting Commissioner of Patents